W. H. Towers,
Horseshoe.
Nº 10,345.      Patented Dec. 20, 1853.
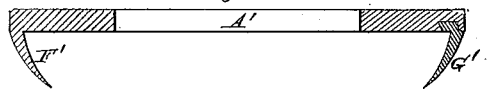
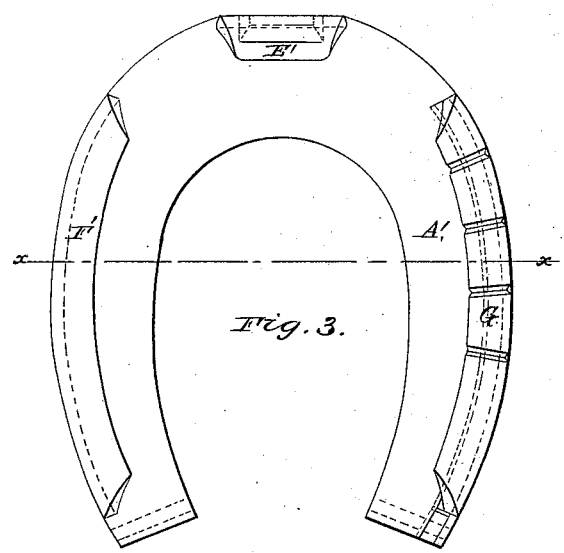
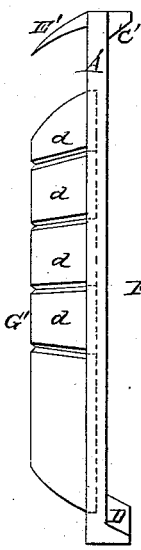
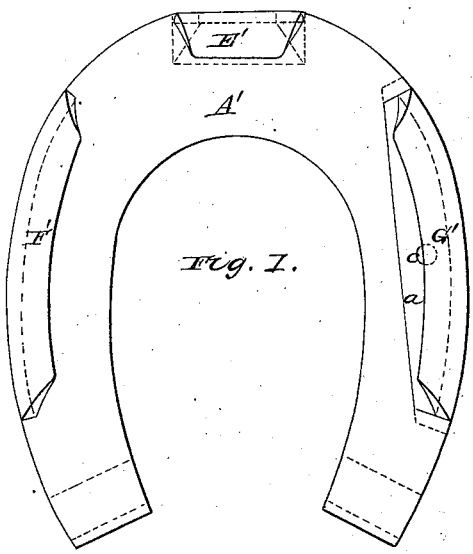
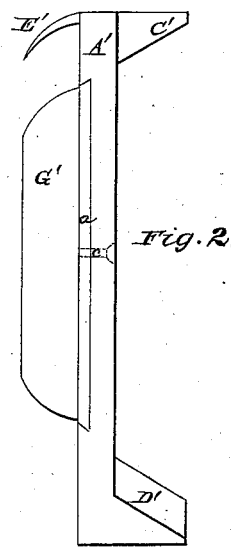

UNITED STATES PATENT OFFICE.

WILLIAM H. TOWERS, OF PHILADELPHIA, PENNSYLVANIA.

IMPROVEMENT IN HORSESHOES.

Specification forming part of Letters Patent No. 10,345, dated December 20, 1853.

*To all whom it may concern:*

Be it known that I, WILLIAM H. TOWERS, of the city and county of Philadelphia, and State of Pennsylvania, have invented a new and useful Improvement in Horseshoes; and I do hereby declare that the following is a full, clear, and exact description of the construction and operation of the same, reference being had to the annexed drawings, forming part of this specification, in which—

Figure 1 is a top view of the shoe. Fig. 2 is a side elevation of same on side of movable flange. Fig. 3 is a top view of shoe with movable flange passed in at heel. Fig. 4 is a side view of same. Fig. 5 is a section on line $x$ $x$ of Fig. 3, showing attachment of flange.

Similar letters of reference in the several figures denote the same part of the shoe.

The nature of my invention consists in making the shoe with inclined flanges or lips rising from the front and sides of its upper surface, corresponding in form with the parts of the hoof against which they are caused to bear when fitted to the horse or other animal, one of which flanges is so constructed as to be capable of removal for fitting the shoe, and afterward to be replaced and fastened by a screw, wedge, or other suitable equivalent in in such a manner as to secure the shoe firmly to the hoof without the aid of the nails heretofore employed for that purpose, which tend to split and weaken the hoof and frequently penetrate the soft and sensitive parts of the foot.

To enable others skilled in the art to make and use my invention, I will proceed to describe its construction and the manner of attaching it to the hoof.

The shoe A' is made of cast, malleable, or wrought iron or other suitable material, to correspond with the form of the hoof of the horse or other animal for which it is designed, the toe C' and heel-calks D' being formed on it at the time of casting or swaging the same. At the front part of the shoe, immediately over the toe, is formed an inclined flange or lip, E', corresponding in its inclination and curvature with the fore part of the hoof, and on the sides next the outer edges of the same, a suitable distance from the toe, are formed the two other flanges or lips, F' G', inclining inward in a similar manner to the flange or lip E', so as to conform to the curvature and inclination of the parts of the hoof situated next the same when the shoe is fitted to the hoof. One of the side flanges, G', is made separate from the shoe and fastened to it by sliding the base $a$ of the flange into a corresponding recess in the side of the shoe, the base being secured by a screw, $c$, passed through it and the shoe, as seen in Fig. 2, or in any suitable manner substantially the same; or the flange may be formed with a dovetail base and passed into a corresponding groove from the heel of the shoe, as seen in Figs. 3 and 5, the forward part of the flange being formed of sections $d$, to facilitate its insertion, a wedge, screw, or other analogous device being used to prevent the slipping of the flange.

The permanent flanges E' and F' may be either cast, swaged, or otherwise secured to the main body of the shoe. All the flanges project sufficiently far above the upper surface, and the two side flanges, F' G', sufficiently far back and toward each other, as to firmly clasp the hoof and prevent the shoe from moving either backward, forward, or sidewise on the same. They are, moreover, made convex on their outer surfaces and tapering to a feather edge at their upper part, with a view of adding to their beauty of appearance when on the horse's foot, and may, if desired, be countersunk in the hoof, so as to cause them to form an even surface with the same.

The manner of attaching my improved shoe to the hoof is as follows: The shoe is adapted by the smith to the size and conformation of the hoof, which is then pared on its lower surface, so that it will rest firmly on the top of the shoe. The hoof is also pared on its front and sides to correspond with the inner surfaces of the flanges or lips E' F' G'. After these preparations are made, the shoe is placed over the hoof, with the permanent front and side flanges in close contact with the portions of the hoof pared to receive them, and the movable flange secured to the shoe by the screw $c$ or any analogous device, thus causing the three flanges to embrace the hoof and firmly hold the shoe in its proper place, the back parts of the side flanges, F' G', approaching each other as they extend backward, and serving to prevent the hoof from receding from the front part of the shoe.

I do not claim the employment of flanges or lips on the upper surface of the shoe; but What I do claim as my invention, and desire to secure by Letters Patent, is—

Constructing the shoe with a detached flange, secured substantially as described, so that the side and front flanges shall firmly fasten the shoe to the hoof, as herein fully set forth.

In testimony whereof I have hereunto signed my name before two subscribing witnesses.

WILLIAM H. TOWERS.

Witnesses:
GEO. PATTEN,
JAS. D. CLAY.